(12) United States Patent
Kamakura et al.

(10) Patent No.: US 8,186,039 B2
(45) Date of Patent: May 29, 2012

(54) METHOD OF MANUFACTURING COIL ASSEMBLY

(75) Inventors: Youichi Kamakura, Anjo (JP); Tetsuya Gorohata, Anjo (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 561 days.

(21) Appl. No.: 12/425,780

(22) Filed: Apr. 17, 2009

(65) Prior Publication Data
US 2009/0260217 A1    Oct. 22, 2009

(30) Foreign Application Priority Data

Apr. 18, 2008 (JP) .................................. 2008-109594

(51) Int. Cl.
*H02K 3/12* (2006.01)
*H02K 15/04* (2006.01)
*H02K 15/02* (2006.01)

(52) U.S. Cl. ............... 29/596; 29/598; 29/605; 310/201; 310/208

(58) Field of Classification Search ............ 29/735–736, 29/596–598, 33 F, 825, 602.1, 605; 310/201, 310/180, 184, 203, 206, 207, 208
See application file for complete search history.

(56) References Cited

U.S. PATENT DOCUMENTS

| | | | | |
|---|---|---|---|---|
| 1,340,712 | A * | 5/1920 | Hare ........................... | 242/395.1 |
| 4,351,102 | A * | 9/1982 | Grozinger et al. ............. | 29/596 |
| 6,140,735 | A * | 10/2000 | Kato et al. ..................... | 310/201 |
| 6,376,961 | B2 * | 4/2002 | Murakami et al. ............ | 310/184 |
| 6,501,205 | B1 * | 12/2002 | Asao et al. ..................... | 310/184 |
| 6,707,211 | B2 * | 3/2004 | Oohashi et al. ............... | 310/179 |
| 6,760,965 | B2 * | 7/2004 | Asao et al. ...................... | 29/596 |
| 6,865,796 | B1 * | 3/2005 | Oohashi et al. ................ | 29/596 |
| 6,951,054 | B2 * | 10/2005 | Hirota et al. ................... | 29/596 |
| 7,365,467 | B2 * | 4/2008 | Bramson et al. .............. | 310/180 |
| 7,386,931 | B2 * | 6/2008 | Neet et al. ....................... | 29/596 |
| 7,804,217 | B2 * | 9/2010 | Hasegawa et al. ............ | 310/179 |

(Continued)

FOREIGN PATENT DOCUMENTS

JP  2000-139048  5/2000

(Continued)

OTHER PUBLICATIONS

Japanese Office Action dated Jan. 5, 2010, issued in corresponding Japanese Application No. 2008-109594, with English translation.

*Primary Examiner* — Derris Banks
*Assistant Examiner* — Kaying Kue
(74) *Attorney, Agent, or Firm* — Nixon & Vanderhye PC

(57) ABSTRACT

A method of manufacturing a coil assembly of a rotary electric machine is disclosed wherein first and second coil wire segments are located on an axis direction in opposition to each other to allow first turn portions of the first and second coil wire segments to intersect with each other (in locating step). Engaging movement, composed of a forward transferring movement, a rotating movement and a translating movement, is conducted on the second coil wire segment with respect to the first coil wire segment to allow the first turn portion of the second coil wire segment to engage a second turn portion of the first coil wire segment (first engaging step). Conducting the engaging movement allows to engage a third turn portion of the first coil wire segment (second engaging step).

9 Claims, 8 Drawing Sheets

U.S. PATENT DOCUMENTS

| | | | |
|---|---|---|---|
| 7,812,498 B2 * | 10/2010 | Kouda | 310/201 |
| 7,856,701 B2 * | 12/2010 | Hirota et al. | 29/596 |
| 7,948,143 B2 * | 5/2011 | Nakamura | 310/201 |
| 7,952,250 B2 * | 5/2011 | Hasegawa et al. | 310/179 |
| 8,008,830 B2 * | 8/2011 | Kouda et al. | 310/201 |
| 2001/0019234 A1 * | 9/2001 | Murakami et al. | 310/180 |
| 2001/0047580 A1 * | 12/2001 | Stratico et al. | 29/596 |
| 2002/0030417 A1 * | 3/2002 | Asao | 310/201 |
| 2002/0092152 A1 * | 7/2002 | Asao et al. | 29/596 |
| 2004/0040142 A1 | 3/2004 | Hirota et al. | |
| 2006/0005376 A1 | 1/2006 | Hirota et al. | |
| 2008/0179983 A1 * | 7/2008 | Hasegawa et al. | 310/179 |
| 2009/0260219 A1 * | 10/2009 | Takada et al. | 29/596 |
| 2010/0077599 A1 * | 4/2010 | Tokizawa | 29/596 |
| 2010/0141078 A1 * | 6/2010 | Kouda et al. | 310/195 |
| 2010/0187938 A1 * | 7/2010 | Yamamoto et al. | 310/195 |
| 2010/0244615 A1 * | 9/2010 | Kouda | 310/215 |

FOREIGN PATENT DOCUMENTS

| | | |
|---|---|---|
| JP | 2002-176752 | 6/2002 |
| JP | 2003-264964 | 9/2003 |
| JP | 2004-104841 | 4/2004 |
| JP | 3894483 | 12/2006 |

* cited by examiner

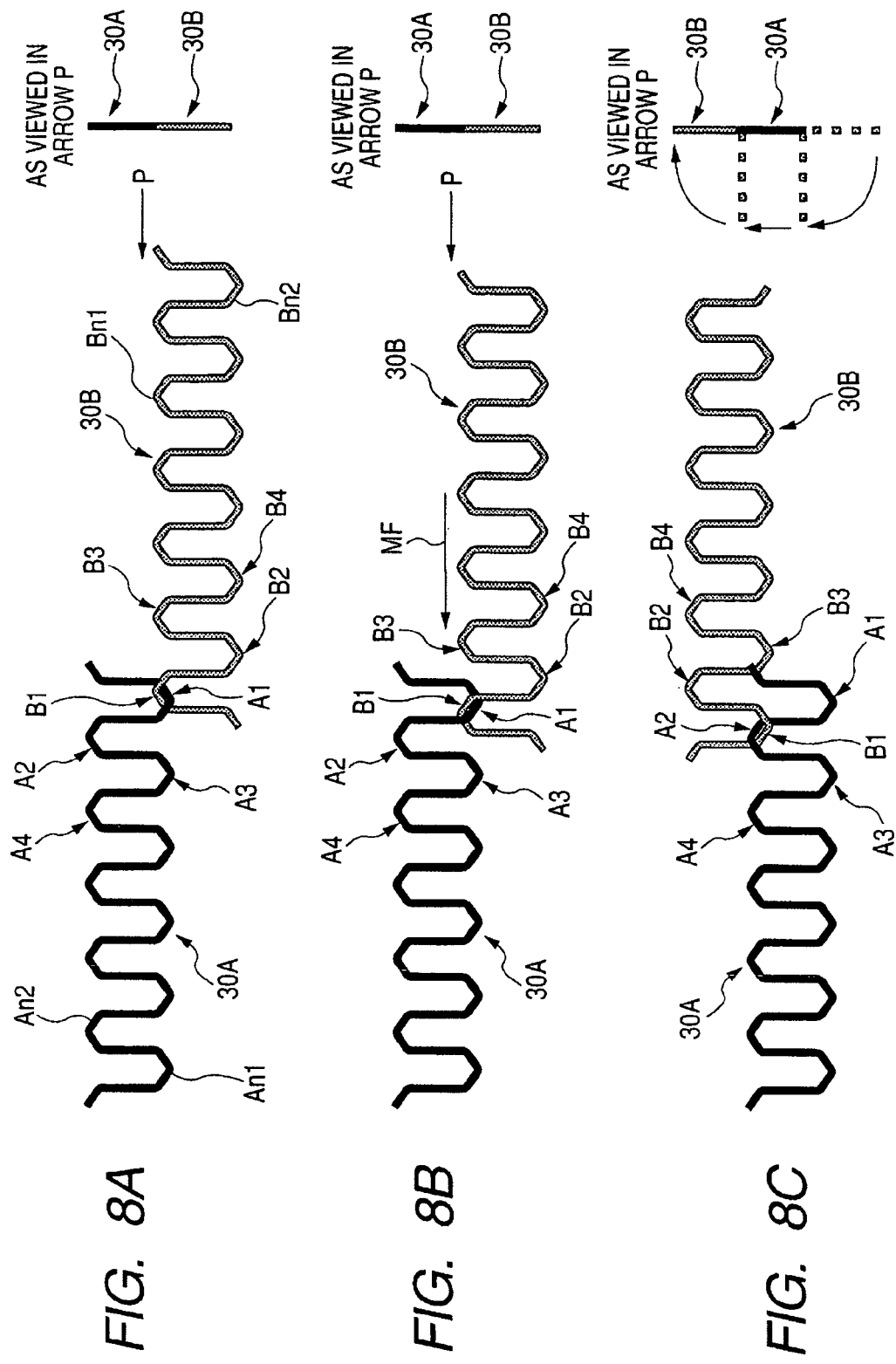

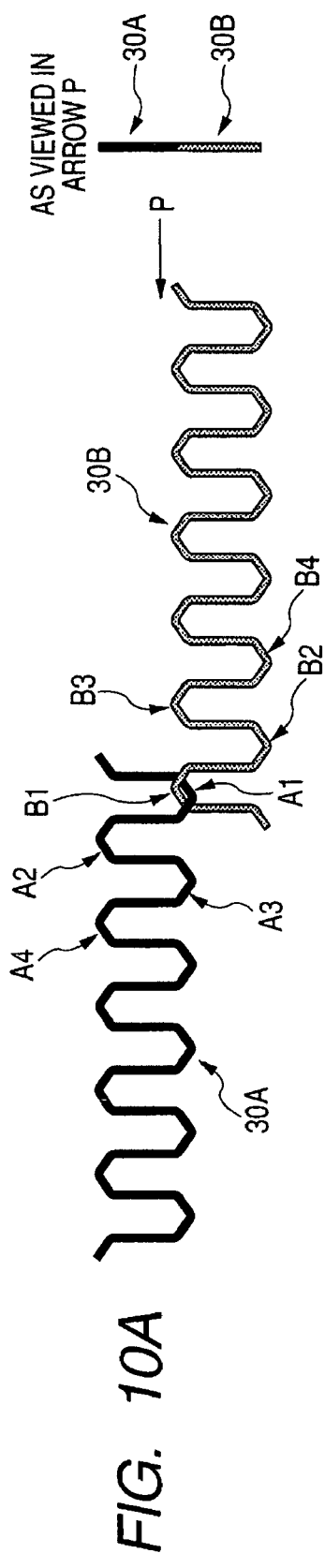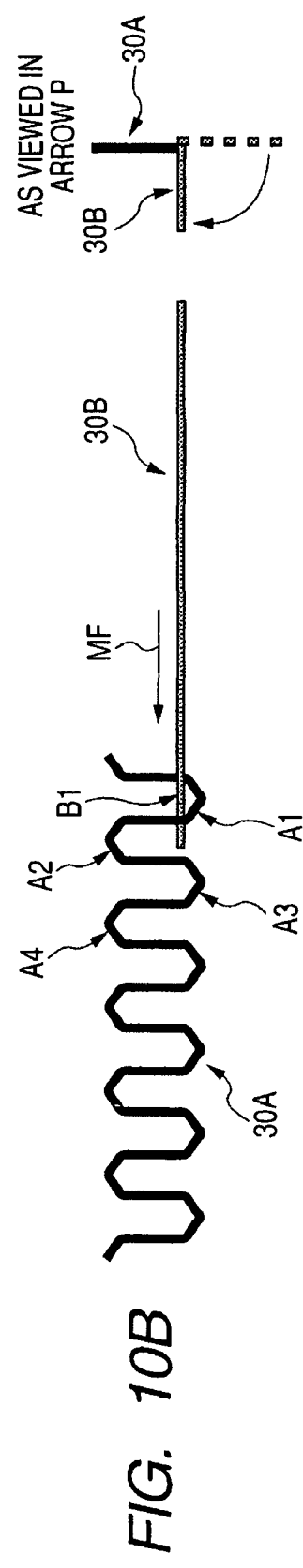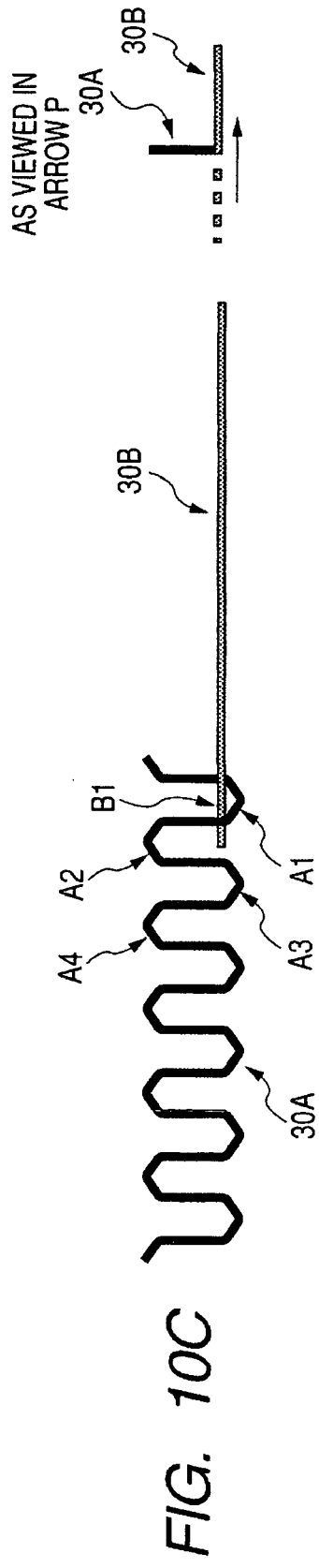

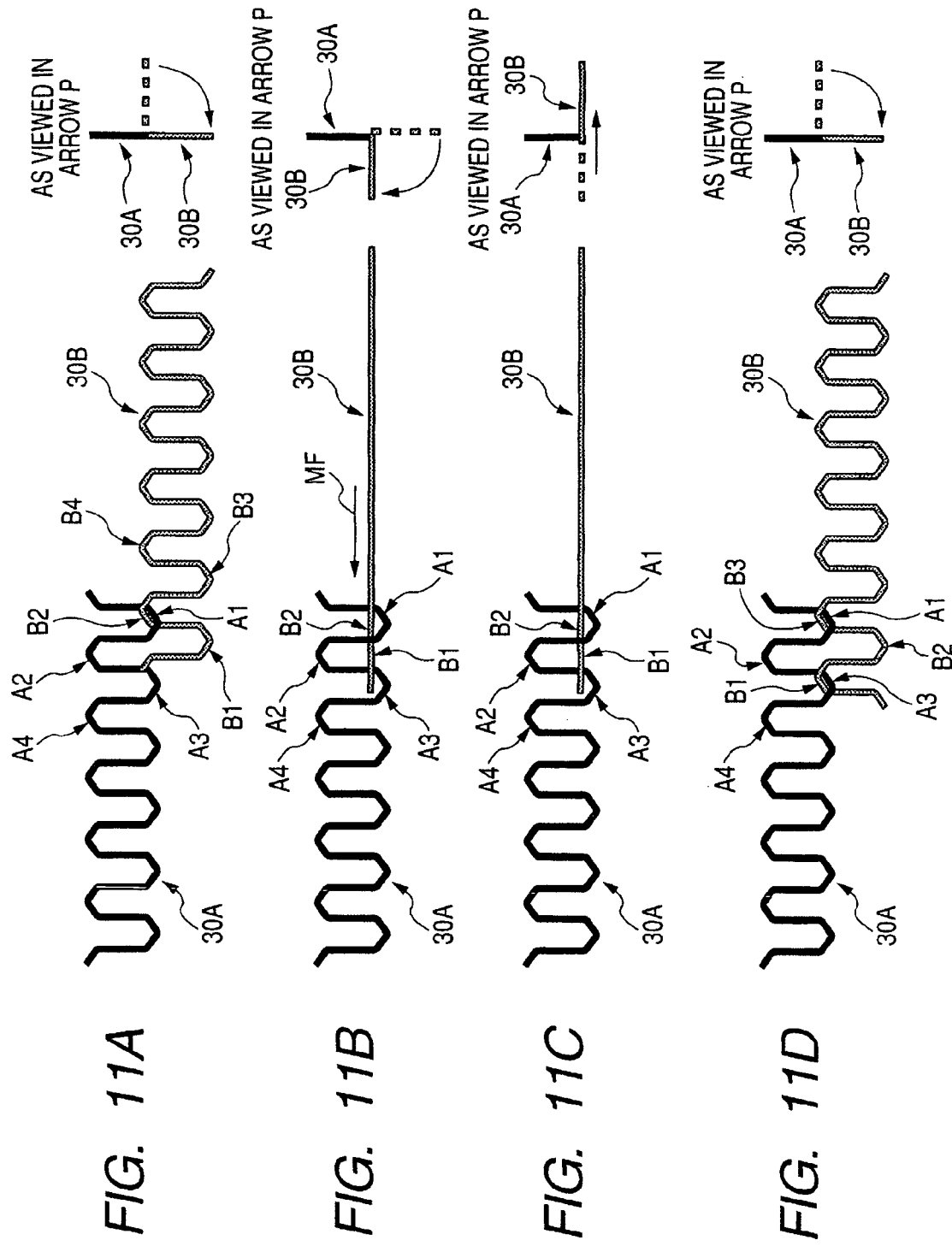

METHOD OF MANUFACTURING COIL ASSEMBLY

CROSS REFERENCE TO RELATED APPLICATIONS

This application is based on Japanese Patent Application No. 2008-109594, filed on Apr. 18, 2008, the content of which is hereby incorporated by reference.

BACKGROUND OF THE INVENTION

1. Technical Field of the Invention

The present invention relates to a method of manufacturing a coil assembly of a rotary electric machine.

2. Description of the Related Art

In the related arts, various methods have heretofore been proposed as a method of manufacturing a coil assembly of a rotary electric machine. For instance, Japanese Patent Application Publication 2002-176752 (Patent Publication 1) proposes a method in which a plurality of coil wire segments is simultaneously woven using a pair of plate-like winding cores placed in opposition to each other. Japanese Patent Application Publication 2004-104841 (Patent Publication 1) proposes a method of weaving coil wire segments into a coil assembly. The weaving method includes: a preparing step to prepare first and second coil wire segments, each subjected to a winding step to have a triangular wave shape; an advancing step to rotate the second coil wire segment about its axis by 90 degrees with respect to the first coil wire segment and advance the second coil wire segment toward the first coil wire segment to increase an overlapping state between the first and second coil wire segments by a half turn; and a rotating step to rotate the second coil wire segment about its axis further by 90 degrees. The advancing step and the rotating step are repeatedly conducted to cause the second coil wire segment to be sequentially woven to the first coil wire segment by a half turn.

However, with the weaving method disclosed in Patent Publication 2, the weaving step is conducted using the coil wire segments of triangular wave shapes. In order to obtain a winding member of a final shape (see FIG. 2 of Patent Publication 2), after the weaving step, a deforming step needs to be conducted to deform a linear portion of each coil wire segment using a movable member (see FIGS. 3 and 4 of Patent Publication 2). Therefore, an issue arises with the occurrence of an increase in the number of man-hours required and there is a risk of damage occurring to an insulating film covering a surface of each coil wire segment when performing the deforming step.

SUMMARY OF THE INVENTION

The present invention has been completed with a view to addressing the above issues and has an object to provide a method of manufacturing a coil assembly of a rotary electric machine that can simply and reliably weave coil wire segments with no need arising to perform a step of deforming the coil wire segments after the completion of a weaving step.

Hereunder, various means, suitable for addressing the above issues, will be described below with reference to various advantageous effects.

To achieve the above object, a first aspect of the present invention provides a method of manufacturing a coil assembly of a rotary electric machine, comprising: a preparing step for preparing first and second coil wire segments each having a plurality of turn portions; a locating step for locating the first and second coil wire segments on an axis direction in opposition to each other such that a first turn portion of the first coil wire segment and a first turn portion of the second coil wire segment intersect with each other; a first engaging step for conducting an engaging movement, composed of a forward transferring movement to transfer the second coil wire segment forward to the first coil wire segment, a rotating movement to rotate the second coil wire segment about the axis direction, and a translating movement to translate the second coil wire segment, for causing the first turn portion of either one of the first and second coil wire segments to engage a second turn portion of the other one of the first and second coil wire segments; and a second engaging step for conducting the engaging movement to allow the first turn portion of the either one of the first and second coil wire segments to engage a third turn portion of the other one of the first and second coil wire segments; whereby the first and second coil wire segments are woven to form the coil assembly.

With the manufacturing method mentioned above, the first and second coil wire segments are located in opposition to each other on the axis direction so as to cause the first turn portion of the first coil wire segment and the first turn portion of the second coil wire segment to intersect with each other. Thereafter, the first and second engaging steps are conducted in sequence to weave the first and second coil wire segments with each other.

In the first engaging step, conducting the engaging movement, composed of the forward transferring movement, the rotating movement and the translating movement, allows the first turn portion of either one of the first and second coil wire segments to engage a second turn portion of the other one of the first and second coil wire segments. In this case, during the translating movement of the engaging movement, the first and second coil wire segments are caused to engage with each other in different engaging patterns depending on a direction in which the second coil wire segment is transferred. When translating the second coil wire segment such that an odd-numbered turn portion of the first coil wire segment is translated to an even-numbered turn portion thereof, the first turn portion of the second coil wire segment is caused to engage the second turn portion of the first coil wire segment. However, when translating the second coil wire segment such that the odd-numbered turn portion of the second coil wire segment is translated to the even-numbered turn portion thereof, the second turn portion of the second coil wire segment is caused to engage the first turn portion of the first coil wire segment.

In the subsequent second engaging step, conducting the engaging movement described above allows the first turn portion of the either one of the first and second coil wire segments to engage the third turn portion of the other one of the first and second coil wire segments. In this case, the second coil wire segment is translated in the same transfer direction as that selected in the first engaging step. Therefore, when translating the second coil wire segment from the odd-numbered turn portion of the first coil wire segment to the even-numbered turn portion thereof, the first turn portion of the second coil wire segment is caused to engage the third turn portion of so the first coil wire segment. On the contrary, when translating the second coil wire segment from the odd-numbered turn portion of the second coil wire segment to the even-numbered turn portion thereof, the third turn portion of the second coil wire segment is caused to engage the first turn portion of the first coil wire segment.

By conducting the first and second engaging steps in such a way, the first turn portion of the either one of the first and second coil wire segments is caused to engage the second or third turn portions of the other one of the first and second coil wire segments one by one in sequence, thereby accomplishing the weaving of the first and second coil wire segments.

Further, subsequent tam portions from a fourth turn portion (regarded to be the second turn portion when the second engaging step has been completed) of the other one of the first and second coil wire segments are subjected to the second engaging step and, thereafter, repeatedly conducting the first and second engaging steps in a similar way enables the first and second coil wire segments to be woven with each other over their entire lengths.

Accordingly, the manufacturing method includes the first engaging step, conducting the engaging movement composed of the forward transferring movement, the rotating movement and the translating movement, and the second engaging step, enabling the coil wire segments, each formed with a plurality of turn portions, to be woven with each other in a simple and reliable manner. In addition, after the coil wire segments are woven with each other, no need arises to conduct a step of deforming the coil wire segments. This enables the suppression of an increase in man-hours required and the occurrence of damage to the insulating film covering surfaces of the coil wire segments.

Furthermore, the coil assembly, manufactured by the manufacturing method of the present invention, is employed in a rotary electric machine having a rotor, incorporating a plurality of magnetic pole pieces alternately disposed on the rotor in a circumferential direction, and a stator having an inner circumferential periphery or an outer circumferential periphery with which the rotor is disposed in face-to-face relation. The coil assembly is formed in multi-phase stator windings, which are formed on approximately rectangular wire segments each having a square shape in cross section and accommodated in a plurality of slots formed in a stator core along a circumferential direction thereof. In addition, each of the coil wire segments includes in-slot portions, disposed in the slots formed at circumferentially spaced positions of the stator core, and a turn portion connected to the in-slot portions at ends thereof in areas outside of the slots. Each coil wire segment has a protruding area, protruding from the slots, formed in a cranked shape having ends extending toward the slots which the coil wire segment straddles. In one alternative, the turn portion may be of a type having a substantially central area formed in a cranked shape with no formation of a twisted part. In another alternative, the coil wire segment may have a substantially central area that has a cranked shape formed in a cranked configuration dislocated by a substantially width of a wire material. In still another alternative, the coil wire segments may be of the types that are continuously formed on the stator core over an entire circumference thereof.

With the manufacturing method set forth above, the first and second engaging steps may preferably allow the forward transferring movement, the rotating movement and the translating movement to be independently conducted.

With such a manufacturing method, respective motions of the forward transferring movement, the rotating movement and the translating movement can be conducted in reliable manners, enabling the relevant turn portions of the first and second coil wire segments to reliably engage in a stabilized fashion without causing any conflict between the first and second coil wire segments. In addition, this enables a simplification of a weaving apparatus to be used, making it possible to achieve a reduction in production cost.

With the manufacturing method set forth above, the first and second engaging steps may preferably allow the forward transferring movement, the rotating movement and the translating movement to be simultaneously conducted.

With such a manufacturing method, the engagement movements of the relevant turn portions of the first and second coil wire segments can be speeded up, thereby enabling a speed-up of the weaving operation.

With the manufacturing method set forth above, the translating movement of the first engaging step may preferably allow the second coil wire segment to be translated from an odd-numbered turn portion to an even-numbered turn portion of the first coil wire segment, and the translating movement of the second engaging step may preferably allow the second coil wire segment to be translated from an even-numbered turn portion to an odd-numbered turn portion of the first coil wire segment.

With such a manufacturing method, the translating movement of the second coil wire segment can be smoothly performed in a related motion with the forward transferring movement and the rotating movement. This makes it possible to smoothly perform the engaging movement between the first and second coil wire segments.

With the manufacturing method set forth above, the translating movement of the first engaging step may preferably allow the second coil wire segment to be translated from an odd-numbered turn portion to an even-numbered turn portion of the second coil wire segment, and the translating movement of the second engaging step may preferably allow the second coil wire segment to be translated from an even-numbered turn portion to an odd-numbered turn portion of the second coil wire segment.

With such a manufacturing method, the second coil wire segment can be subjected to the forward transferring movement, the translating movement and the rotating movement on the odd-numbered turn portion of the first coil wire segment, resulting in a reduction in a transfer distance of the second coil wire segment. Therefore, the engagement movements of the relevant turn portions of the first and second coil wire segments can be speed up, thereby enabling a speed-up of the weaving operation.

With the manufacturing method set forth above, after the second engaging step has been completed, the first and second engaging steps may be similarly and repeatedly conducted to allow the first turn portion of the second coil wire segment to engage respective subsequent turn portions from a fourth turn portion of the second coil wire segment in sequence.

With such a manufacturing method, repeatedly conducting the first and second engaging steps in a similar manner, after the second engaging step has been completed, enables the first and second coil wire segments to be woven with each other over entire lengths from the first turn portions to final turn portions.

With such a manufacturing method, each of the first and second coil wire segments may preferably include a plurality of in-slot portions placed in slots of a stator core of the rotary electric machine, and the plurality of turn portions each connected between the in-slot portions placed in the slots circumferentially spaced from each other.

With such a manufacturing method, it becomes possible to select optimum coil wire segments in use in conformity to sizes of the stator core and each slot.

With the manufacturing method set forth above, the in-slot portions and each of the turn portions may be preferably connected to each other through connecting portions that are bent.

With such a manufacturing method, neighboring in-slot portions can be widely separated, enabling the engagement movement in the first and second engaging steps to be easily performed while avoiding a conflict between the first and second coil wire segments. Especially, this is quite advantageous when weaving a large number of coil wire segments.

With the manufacturing method set forth above, each of the first and second coil wire segments may preferably include odd-numbered turn portions and even-numbered turn portions alternately placed in positions displaced by an angle of 180 degrees in phase about the axis direction.

With such a manufacturing method, the coil wire segments are used with the odd-numbered turn portions and the even-numbered turn portions being alternately placed in positions displaced by 180 degrees in phase about the axis direction, thereby making it possible to easily and reliably conduct the first and second engaging steps. Therefore, the relevant turn portions of the first and second coil wire segments can be easily and reliably woven.

With the manufacturing method set forth above, each of the turn portions includes a plurality of cranked portions formed in stepwise shapes.

With such a manufacturing method, the turn portion has a lower height than that of a turn portion, formed in a triangle shape with no formation of a cranked portion, of a coil wire segment of the related art. This enables the coil assembly to have turn portions axially protruding outward from the stator core in reduced axial heights.

A second aspect of the present invention provides a method of manufacturing a coil assembly of a rotary electric machine, comprising: a preparing step for preparing first and second woven coil wire segments prepared by the method of manufacturing the coil assembly of the rotary electric machine according to the first aspect of the present invention; a locating step for locating the first and second woven coil wire segments in opposition to each other on the axis direction such that a first turn portion of the first woven coil wire segment and a first turn portion of the second woven coil wire segment intersect with each other; a first engaging step for conducting an engaging movement, composed of a forward transferring movement to transfer the second woven coil wire segment forward to the first woven coil wire segment, a rotating movement to rotate the second woven coil wire segment about the axis direction, and a translating movement to translate the second woven coil wire segment for causing the first turn portion of either one of the first and second woven coil wire segments to engage a second turn portion of the other one of the first and second woven coil wire segments; and a second engaging step for conducting the engaging movement to allow the first turn portion of the either one of the first and second woven coil wire segments to engage a third turn portion of the other one of the first and second woven coil wire segments; whereby the first and second woven coil wire segments are woven to form the coil assembly.

With such a manufacturing method, the weaving is performed using the woven coil wire segments with a plurality of coil wire segments being woven, more than four coil wire segments can be woven. This results in a capability of simply manufacturing a coil assembly manufactured by weaving a large number of coil wire segments.

BRIEF DESCRIPTION OF THE DRAWINGS

These and other features and advantages of the present invention will become more apparent in light of the following description, as illustrated in the accompanying drawings, in which:

FIGS. 8A to 8C are views illustrating the method of manufacturing of the coil assembly of the first embodiment with FIGS. 8A and 8B showing a second rotating step and FIG. 8C showing a subsequent rotating step.

FIGS. 10A to 10C are views illustrating a method of manufacturing a coil assembly of a second embodiment with FIGS. 9A and 9B showing a locating step and FIG. 8C showing a first rotating step.

FIGS. 11A to 11D are views illustrating the method of manufacturing the coil assembly of the second embodiment with FIGS. 9A and 9B showing a second rotating step and FIG. 8C showing a subsequent rotating step.

DETAILED DESCRIPTION OF PREFERRED EMBODIMENTS

Now, methods of manufacturing a coil assembly of a rotary electric machine of various embodiments according to the present invention will be described below in detail with reference to the accompanying drawings. However, the present invention is construed not to be limited to such embodiments described below and technical concepts of the present invention may be implemented in combination with other known technologies or the other technology having functions equivalent to such known technologies.

In the following description, it is to be understood that such terms as "forward", "axis", "opposition", "translate", "engage", "end", "circumferentially" and the like are words of convenience and are not to be construed as limiting terms.

Hereunder, the methods of manufacturing the coil assembly of the rotary electric machine of materialized embodiments will be described below in detail with reference to the accompanying drawings.

First, an outline structure of a stator 10 of a rotary electric machine incorporating a coil assembly 20, manufactured by the manufacturing methods of the various embodiments according to the present invention, is described below in detail.

Figure 1A:
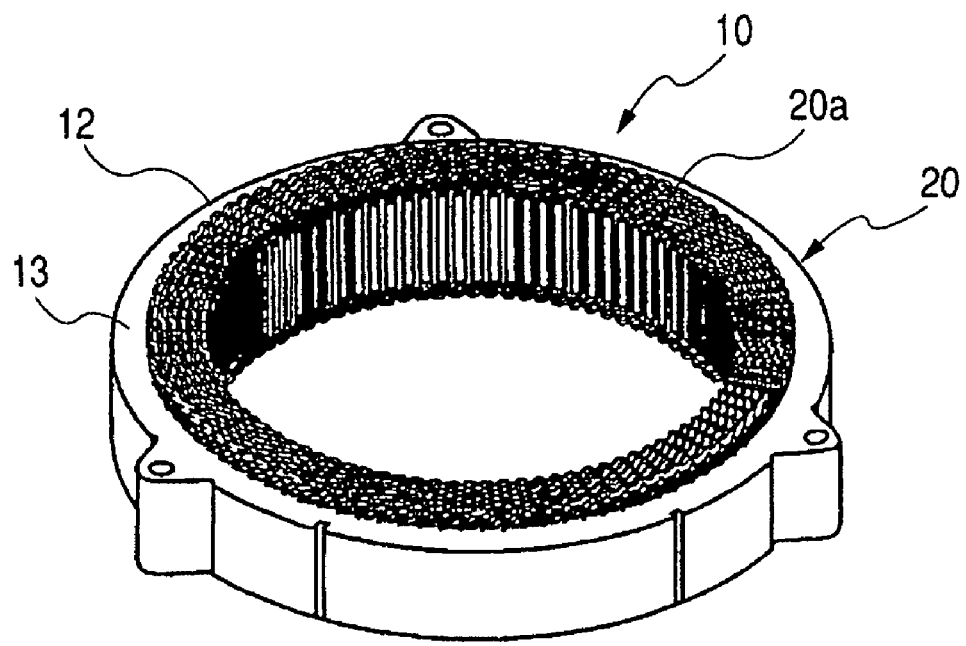
FIG. 1A is a perspective view showing an outer profile of a stator of a rotary electric machine incorporating a coil assembly manufactured with a manufacturing method of a first embodiment according to the present invention.
Figure 1B:
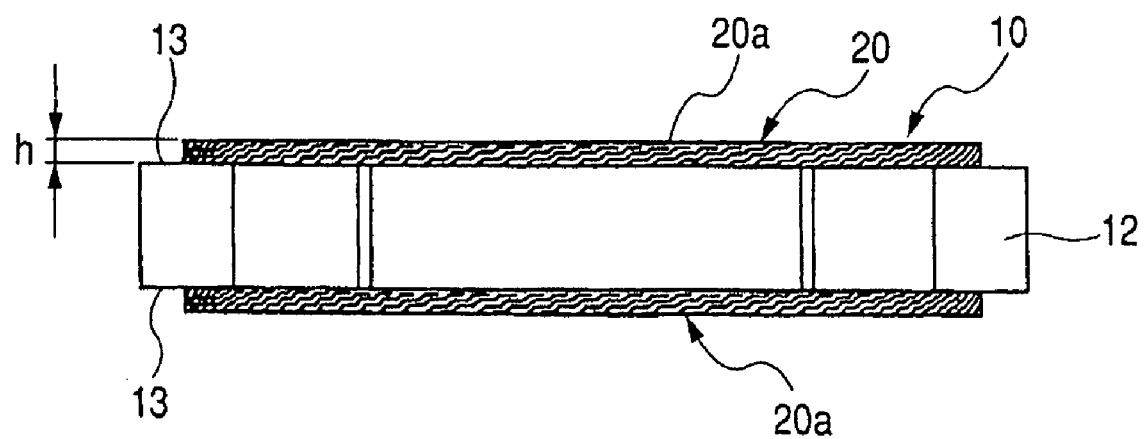
FIG. 1B is a side view of the stator shown in FIG. 1A as viewed the stator at a side area thereof.
Figure 2:
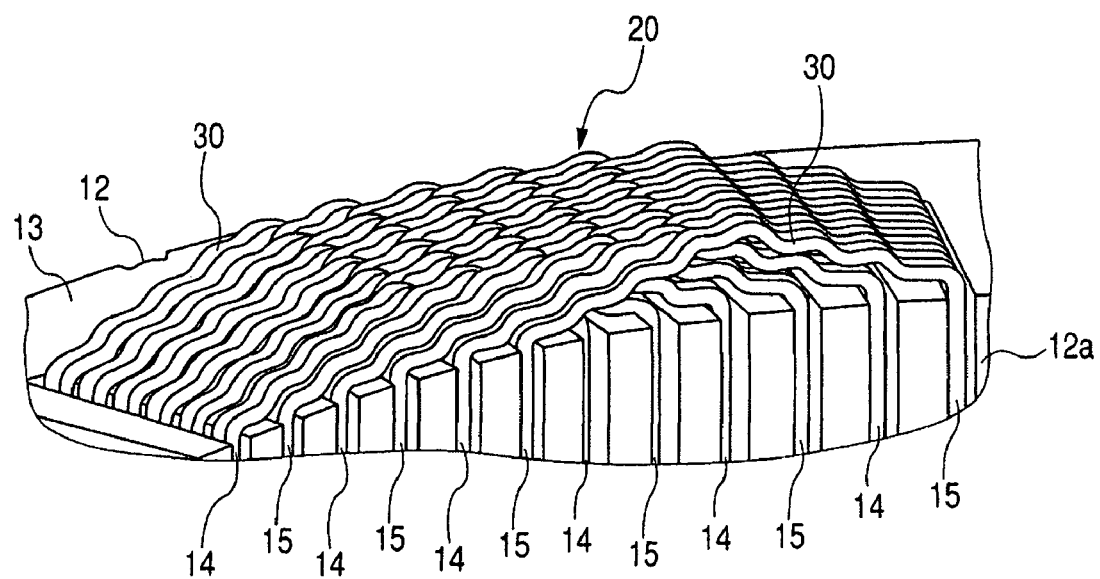
FIG. 2 is a fragmentary perspective view of the stator in an enlarged scale.

FIG. 1A is a perspective view showing an external appearance of the stator 10 of the rotary electric machine to which the coil assembly 20 is applied. FIG. 1B is a side view of the stator 10 as viewed on a side thereof FIG. 2 is a fragmentary perspective view showing a part of the stator 10 in an enlarged scale.

As sown in FIGS. 1A and 1B, the stator 10 is employed in a rotary electric machine having functions of, for instance, a vehicular electric motor and an electric power generator in combination. The stator 10 has an inner circumferential periphery in which a rotor (not shown) is rotatably supported in a radially face-to-face relation. The rotor has an outer circumferential periphery carrying thereon a plurality of magnetic pole pieces composed of permanent magnets with different polarities alternately placed along a circumferential direction of the rotor such that the magnetic pole pieces face the inner circumferential periphery of the stator 10.

The stator 10 includes a stator core 12 composed of a plurality of magnetic steel plates, each having a given thickness, which are stacked one another to form an annular configuration extending in an axis direction. As shown in FIG. 2, the stator core 12 has the inner circumferential periphery 12a formed with a plurality of sets of slots 14 and 15 provided at circumferentially spaced positions. The coil assembly 20, incorporating stator windings, takes the form of three phase weavings each of which includes plural sets of slots 14 and 15 circumferentially adjacent to each other. The stator windings for different phases are accommodated in three sets of slots 14 and 15 placed circumferentially adjacent to each other with one set being composed of the slots 14 and 15.

Figure 3:
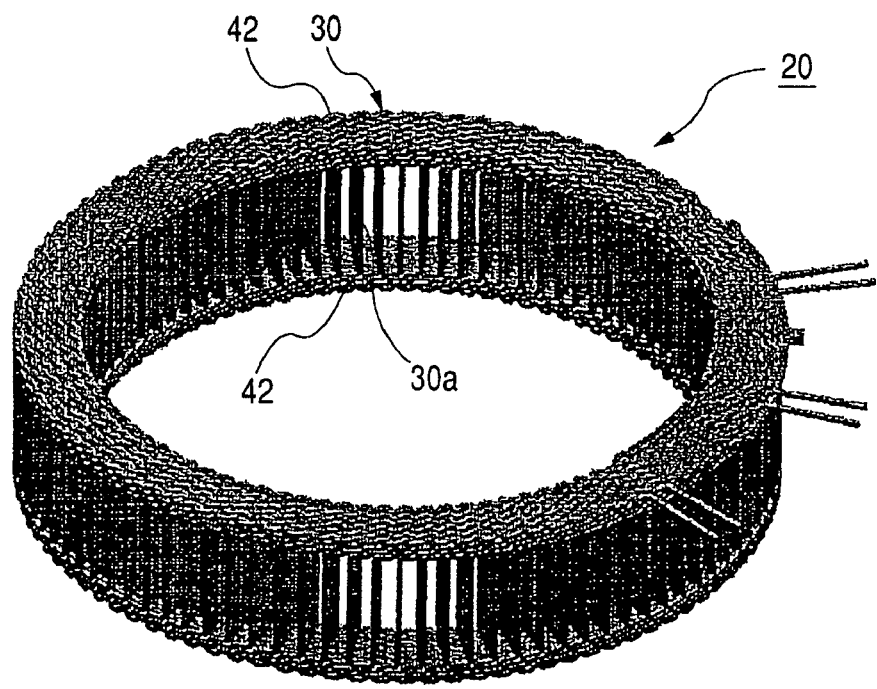
FIG. 3 is a perspective view of the coil assembly incorporated in the stator shown in FIGS. 1A and 1B.
Figure 4:
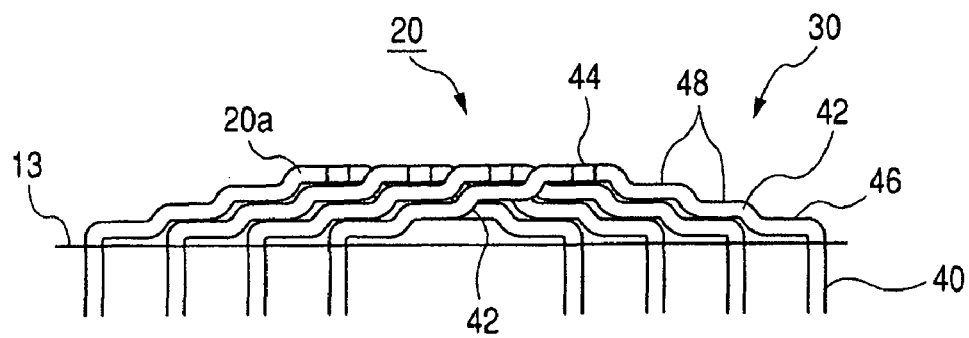
FIG. 4 is a fragmentary front view showing coil end portions of the coil assembly incorporated in the stator shown in FIGS. 1A and 1B.
Figure 5:
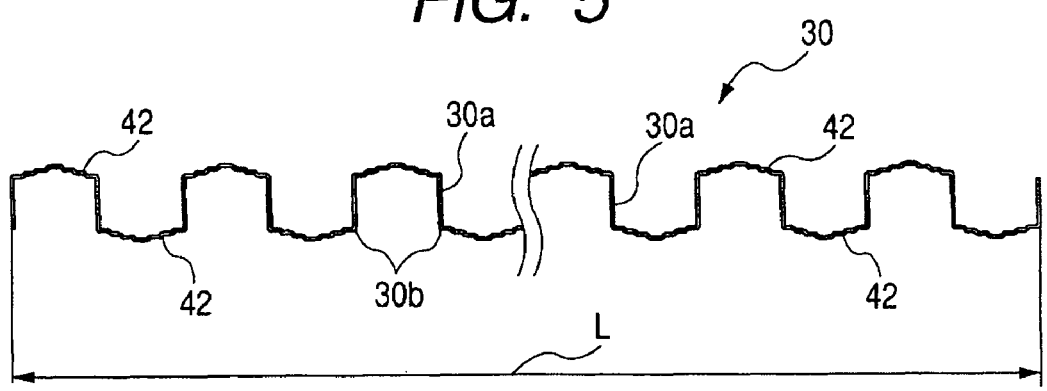
FIG. 5 is a front view showing a whole shape of a coil wire segment used for the coil assembly incorporated in the stator shown in FIGS. 1A and 1B.
Figure 6:
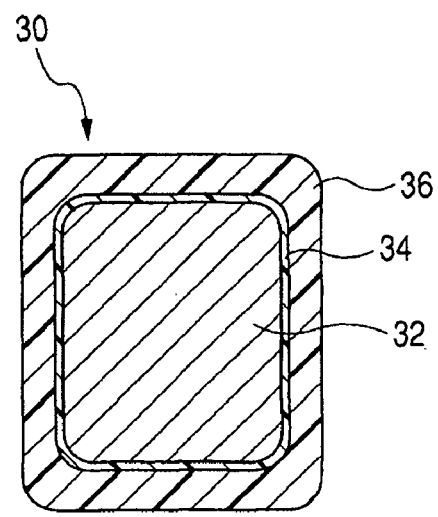
FIG. 6 is a cross-sectional view showing the coil wire segment used for the coil assembly incorporated in the stator shown in FIGS. 1A and 1B.
Figure 7:
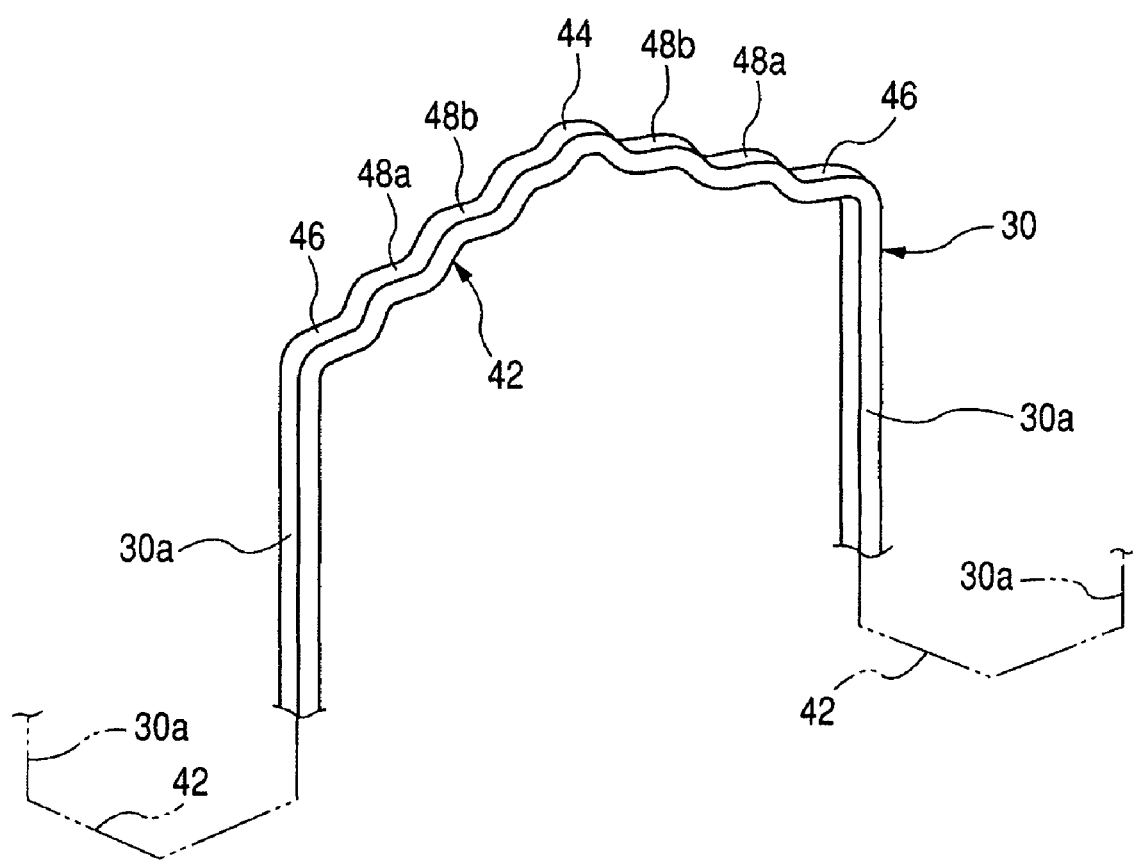
FIG. 7 is a perspective view showing a profile of a turn portion of the coil wire segment used for the coil assembly incorporated in the stator shown in FIGS. 1A and 1B.

Next, an overall structure of the coil assembly 20 will be described below. FIG. 3 is a perspective view showing the external appearance of the coil assembly 20. FIG. 4 is a fragmentary front view showing coil end portions 20a of the coil assembly 20 and FIG. 5 is a front view showing an overall shape of a coil wire segment 30. FIG. 6 is a cross sectional view of the coil wire segment 30 and FIG. 7 is a perspective view showing a shape of a turn portion 42 of the coil wire segment 30.

As shown in FIG. 5, the coil wire segment 30 of the coil assembly 20 is comprised of a plurality of in-slot portions 30a spaced at equal intervals in parallel to each other and a plurality of turn portions 42 extending between adjacent in-slot portions 30a at alternately opposite ends thereof. The coil wire segment 30 of the coil assembly 20 is made of a single rod formed in a length L of approximately 3 m. As shown in FIG. 6, further, the coil wire segment 30 is comprised of a conductive body 32, made of copper, and an insulation sheath composed of an inner insulation layer 34 covering an outer circumference of the conductive body 32 for electrical insulation and an outer insulation layer 36 covered on the inner insulation layer 34.

The inner insulation layer 34 covers the outer circumference of the conductive body 32 and the outer layer 36 covers an outer periphery of the inner insulation layer 34. The insulation sheath, involving the inner and outer insulation layers 34 and 36, has a total thickness of a value determined to fall in a range from 100 µm to 200 µm. Thus, the insulation sheath, composed of the inner and outer insulation layers 34 and 36, has a thick thickness and, hence, no need arises for an insulation paper sheet or the like to be interposed between the neighboring coil wire segments 30 for providing electrical insulation from each other.

The outer insulation layer 36 is made of insulation material and the inner insulation layer 34 is made of insulation material such as thermoplastic resin, having a higher glass transition temperature than that of the outer insulation layer 36, or polyamide-imide resin or the like having no glass transition temperature. With such a structure, the outer insulation layer 36 is softened faster than the inner insulation layer 34 due to heat arising during the operation of the rotary electric machine. Therefore, the coil wire segments 30, placed in the same slot 14, are thermally bonded to each other at the outer insulation layers 36. As a result, the plural coil wire segments 30, placed in the same slot 14, are unitized in structure such that the unitized coil wire segments 30 serve as a rigid-body structure. This allows the plural coil wire segments 30, placed in the same slot 14, to have increased mechanical strength. In addition, even if the rotary electric machine encounters vibration in excess, a bonding area between the inner and outer insulation layers 34 and 36 are peeled off from each other faster than that of a bonding area between the inner insulation layer 34 and the conductive body 32. This permits the inner insulation layer 34 and the conductive body 32 to remain in a bonding state with a reliable insulating effect.

As shown in FIGS. 2, 4 and 5, the coil wire segments 30 include the in-slot slot portions 30a that are disposed in the slots 14 and 15 of the stator core 12. The turn portions 42 protrude from the slots 14 and 15 in areas axially outside of the stator core 12 and extend between the in-slot portions 30a and 30a placed in the slots 14 and 15 circumferentially spaced from each other. Thus, the coil wire segments 30 are supported with the stator core 12 in wave winding, thereby forming a stator winding (coil assembly) 20. The turn portions 42 are formed in the areas near both axial ends of the stator coil 12 at circumferentially adjacent positions, respectively. In this case, each of the in-slot portions 30a and each of the turn portions 42 are connected to each other at a connection portion 30b that is bent at a substantially right angle. The coil wire segment 30 has an odd numbered turn portion and an even numbered turn portion alternately formed at positions displaced in phase by an angle of 180 degrees about an axis of rotation.

As shown in FIG. 7, each turn portion 42 has a substantially central area formed with a non-twisted central cranked portion 44. The central cranked portion 44 has a cranked shape formed in an area along an end face 13 of the stator core 12. The central cranked portion 44 is displaced, caused by the presence of the cranked shape, by a value substantially equivalent to a width of the coil wire segment 30. This allows the coil wire segments 30, radially placed adjacent to each other, to be densely wounded. As a result, the coil end has a small radial width, thereby preventing the coil assembly 20 from jutting radially outward of the stator core 12.

As shown in FIGS. 2, 4 and 7, further, the turn portion 42 has protruding areas, protruding axially outward from the relevant slots 14 and 15, which have side cranked portions 46 extending from the in-slot portions 30a at areas axially outward of the slots 14 and 15 in close proximity to the end face 13 of the stator core 12, respectively, and connected to each other via the central cranked portion 44. With such a structure, the turn portion 42 of the coil wire segment 30 protrudes from the slots 14 and 15 by an interval, spaced from the end face 13, which is narrower than a distance between the relevant slots which the coil wire segment 30 straddles. As a result, the coil end of the coil assembly 20 has a reduced axial height "h".

Furthermore, assuming each cranked portion 46 extending along the end face 13 of the stator core 12 has a length of "d1" and a distance between the circumferentially adjacent slots is "d2", the relationship is expressed as $d1 \leq d2$. This effectively prevents the cranked portion 46 of one coil wire segment 30, having the in-slot portions 40 accommodated in one pair of slots, from conflicting the other coil wire segment 30 extending from the circumferentially neighboring slot. This avoids the coil wire segments 30, protruding from the circumferentially neighboring slots, from conflicting each other. This prevents an increase in axial height of the coil end or an increase in width of the coil end in a radial direction. As a result, the coil end can be lowered in height. In addition, the coil end can have a decreased width in the radial direction, thereby precluding the coil assembly 20 from jutting radially outward of the stator core 12.

Moreover, the coil wire segment 30 has two intermediate cranked portions 48a and 48b formed between the central cranked portion 44, placed at the substantially central area of the turn portion 42, and each of the side cranked portions 46 contiguous with the in-slot portions 30a. That is, the coil wire segment 30 has a total of seven cranked portions formed on the turn portion 42 in the areas facing each of the end faces 13 of the stator core 12. This allows the turn portion 42 (i.e., the end portion) of the coil wire segment 30 to have the height "h" that is made lower in axial height than that of a triangular turn portion with no formation of the cranked portions. Like profiles of the cranked portions 44 and 46, the cranked portions 48a and 48b have cranked configurations formed in cranked shapes extending along the end face 13 of the stator core 12. Accordingly, the turn portion 42 of the coil wire segment 30 has both sides formed in stepped configurations with respect to the central cranked portion 44.

With the coil assembly 20 formed in the three-phase stator windings, the coil wire segments 30 for each phase per one pole of the rotor are accommodated in the two slots 14 and 15 (see FIG. 2). That is, the stator core 12 has a total of six slots (i.e., 3×2=6) per one pole of the rotor for the coil assembly 20 having the in-slot portions 30a consecutively placed in the slots circumferentially adjacent to each other. As a result, the coil wire segments 30, straddling the circumferentially different slots, are accommodated in the slots circumferentially spaced by six slots. Thus, each of the coil wire segments 30 may preferably include the turn portion 42 provided with (3×2+1=7) pieces of the cranked portions, involving the central cranked portion 44 placed at the substantially central position of each coil wire segment 30. This avoids the occurrence of interference among the coil wire segments 30 protruding from the circumferentially adjacent slots. With the provision of the seven cranked portions on the coil wire segment 30 at the coil end axially facing the end face 13 of the stator coil 12, the coil end of the coil wire segment 30 has a reduced axial height, thereby enabling the coil end to have a reduced radial width.

First Embodiment

Next, a method of manufacturing the coil assembly 20 of a first embodiment will be described below in detail with reference to FIGS. 8A-8C and 9A-9C.

FIGS. 8A-8C and FIGS. 9A-9C are views illustrating how the coil wire segments are woven using a weaving method employed in the method of manufacturing the coil assembly 20 of the present embodiment. In FIGS. 8A-8C and FIGS. 9A-9C, right-hand views show first and second coil wire segments remained under woven states as view in arrows P.

With the first embodiment, first and second coil wire segments 30A and 30B are used each of which is preliminarily processed by forming linear shaped wire segments with the use of a pressing die and has the same shape as the coil wire segment 30 shown in FIG. 5. Moreover, it will be appreciated that the first and second coil wire segments 30A and 30B have turn portions similar in shape to those shown in FIG. 7 but simply illustrated in linear shapes in FIGS. 8A-8C and 9A-9C, respectively.

The weaving method of the present embodiment for weaving the first and second coil wire segments 30A and 30B includes a locating step, a first engaging step and a second engaging step that are performed in sequence.

First in locating step, as shown in FIG. 8A, the first and second coil wire segments 30A and 30B are prepositioned in an axis direction in opposition to each other such that a first turn portion A1 of the first coil wire segment 30A and a first turn portion B1 of the second coil wire segment 30B intersect with each other. In a placement shown in FIG. 8A, the first coil wire segment 30A is positioned on a left side and the second coil wire segment 30B is positioned on a right side.

As used herein, the term "axis direction" refers to a horizontal axis direction extending parallel to horizontal centerlines lying at horizontal centers of the first coil wire segment 30A and the second coil wire segment 30B, respectively.

The first turn portion A1 of the first coil wire segment 30A is located at a right end and respective turn portions subsequent to a second turn portion A2 continue in sequence toward a left side. The first coil wire segment 30A has odd-numbered turn portions A1, A3 . . . and An1 lie in a lower and even-numbered turn portions A2, A4 . . . and An2 lie in an upper area.

Meanwhile, the first turn portion B1 of the second coil wire segment 30B is located at a left end and respective turn portions subsequent to a second turn portion B2 continue in sequence toward a right side. Odd-numbered turn portions B1, B3 . . . and Bn1 lie in an upper area and even-numbered turn portions B2, B4 . . . and Bn2 lie in lower area.

In the placement shown in FIG. 8A, the first turn portion A1 of the first coil wire segment 30A and the first turn portion B1 of the second coil wire segment 30B intersect with each other such that a left half portion of the first turn portion B1 straddles over a right half portion of the first turn portion A1 from a front side to a rear side.

Then, in the subsequent first engaging step, a series of engaging operations is performed including a forward transferring movement, a rotating movement and a translating movement as shown in FIGS. 8B and 8C. This causes the first turn portion B1 of the second coil wire segment 30B to be brought into engagement with the second turn portion A2 of the first coil wire segment 30A. During such operations, first as shown in FIG. 8B, the forward transferring movement is performed moving the second coil wire segment 30B forward with respect to the first coil wire segment 30A as shown by an arrow MF (leftward) along the axis direction. This causes an intersecting position between the first turn portion A1 of the first coil wire segment 30A and the first turn portion B1 of the second coil wire segment 30B to shift in a direction as shown by the arrow P (leftward) depending on a forward movement travel.

Thereafter, as shown in FIG. 8C, the first rotating movement, the translating movement and a second rotating movement are consecutively performed on the first coil wire segment 30A. That is, first, the first rotating movement is conducted rotating the second coil wire segment 30B, having the first turn portion B1 engaging the first turn portion A1 of the first coil wire segment 30A, clockwise at an angle of substantially 90 degrees as viewed in the arrow P with the first turn portion B1 (the first turn portion A1) placed at a fulcrum. Subsequently, the translating movement is performed parallel displacing the second coil wire segment 30B in transition from the first turn portion A1 of the first coil wire segment 30A (on the odd-numbered turn portion) to the second turn portion A2 (on the even-numbered turn portion). Consecutively, the second rotating movement is conducted rotating the second coil wire segment 30B clockwise at an angle of substantially 90 degrees as viewed in the arrow P with the first turn portion B1 (the second turn portion A2) of the second coil wire segment 30B placed at a fulcrum. This results in a consequence in which the first turn portion B1 of the second coil wire segment 30B is brought into engagement with the second turn portion A2 of the first coil wire segment 30A.

Figure 9A:
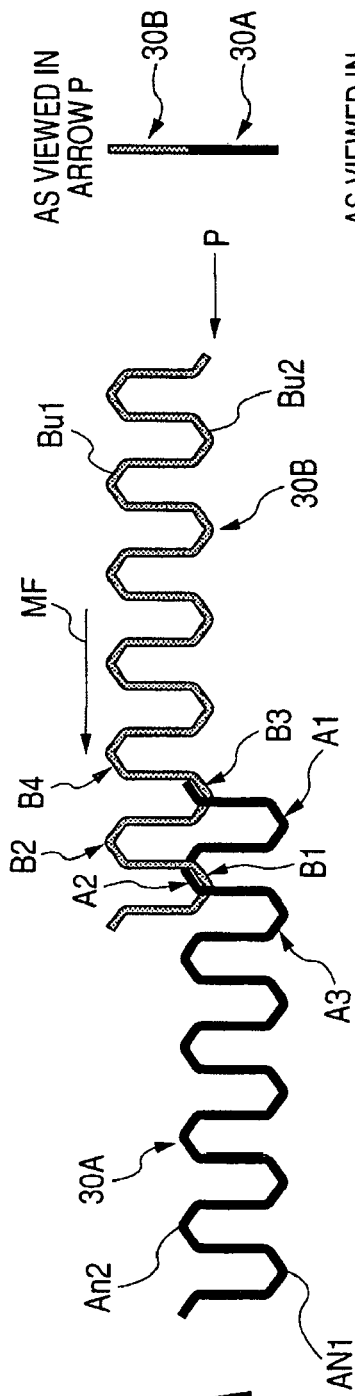
FIGS. 9A to 9C are views illustrating a method of manufacturing of the coil assembly of the first embodiment with FIGS. 9A and 9B showing a second rotating step and FIG. 8C showing a subsequent rotating step.
Figure 9B:
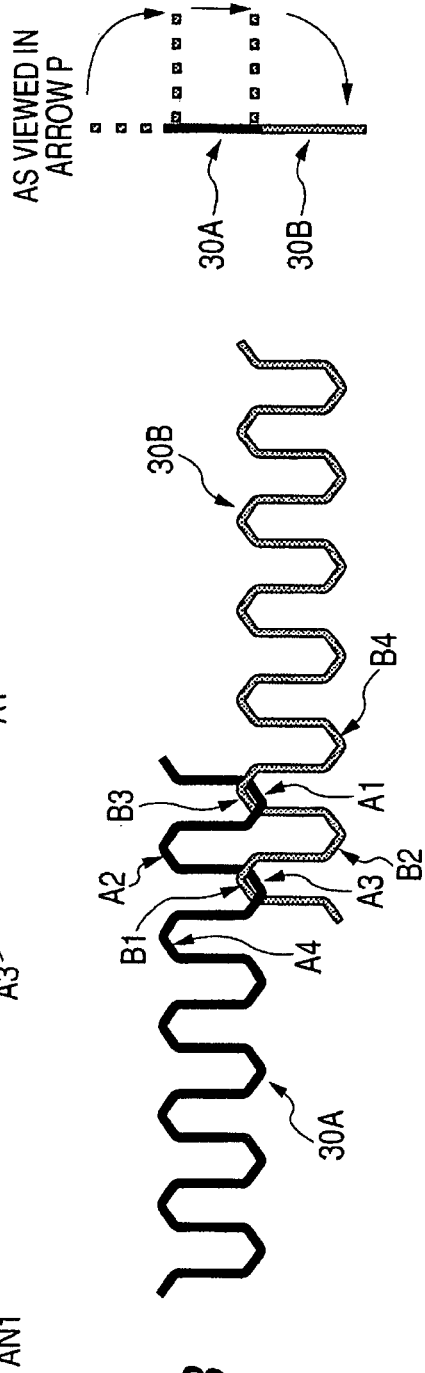

Then, in the subsequent second engaging step, the engaging operations, composed of a forward transferring movement, a rotating movement and a translating movement like those of the first engaging step, is performed as shown in FIGS. 9A and 9B. This causes the first turn portion B1 of the second coil wire segment 30B to be brought into engagement with a third turn portion A3 of the first coil wire segment 30A. That is, as shown in FIG. 9A, first, the forward transferring movement is performed moving the second coil wire segment 30B forward with respect to the first coil wire segment 30A as shown by the arrow MF in the arrow P (leftward) along the axis direction. This causes an intersecting position between the second turn portion A2 of the first coil wire segment 30A and the first turn portion B1 of the second coil wire segment 30B to shift in a direction as shown by the arrow P (leftward) depending on a forward movement travel.

Thereafter, as shown in FIG. 9B, the first rotating movement, the translating movement and the second rotating movement are consecutively performed on the first coil wire segment 30A. That is, first, the first rotating movement is conducted rotating the second coil wire segment 30B, having the first turn portion B1 engaging the second turn portion A2 of the first coil wire segment 30A, clockwise at an angle of substantially 90 degrees as viewed in the arrow P with the first turn portion B1 (the second turn portion A2) placed at a fulcrum. Subsequently, the translating movement is performed parallel displacing the second coil wire segment 30B in transition from the second turn portion A2 of the first coil wire segment 30A (on the odd-numbered turn portion) to a third turn portion A3 (on an even-numbered turn portion). Consecutively, the second rotating movement is conducted rotating the second coil wire segment 30B clockwise at an angle of substantially 90 degrees as viewed in the arrow P with the first turn portion B1 (the third turn portion A3) of the second coil wire segment 30B placed at a fulcrum. This results in a consequence in which the first turn portion B1 of the second coil wire segment 30B is brought into engagement with the third turn portion A3 of the first coil wire segment 30A. When this takes place, further, a third turn portion B3 of the second coil wire segment 30B is brought into engagement with the first turn portion A1 of the first coil wire segment 30A.

Upon completing the second engaging step, the first and second engaging operations are repeatedly conducted in a similar way. This allows the first turn portion B1 of the second coil wire segment 30B to be brought into engagement with respective turn portions subsequent to a fourth turn portion A4 of the first coil wire segment 30A such that the first and second coil wire segments 30A and 30B are brought into engagement (woven) with each other at relevant turn portions in overall lengths.

Figure 9C:
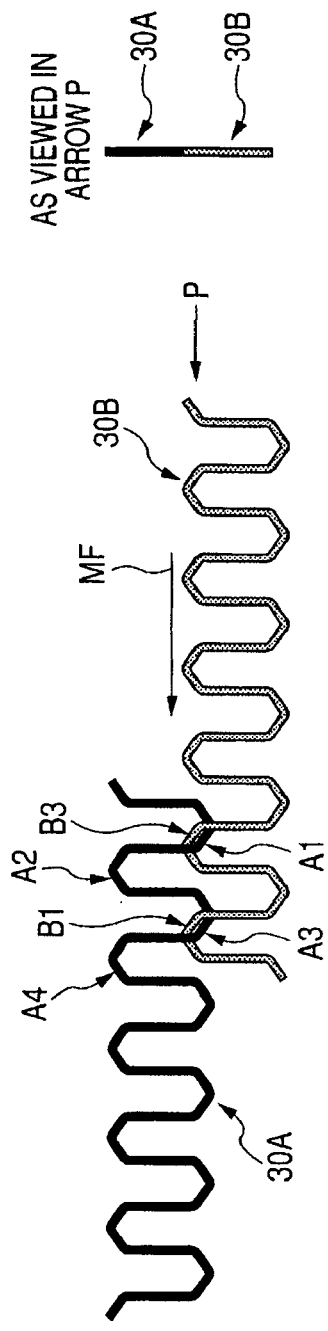

Upon completing the second engaging step, as shown in FIG. 9C, like the forward transferring movement of the first engaging operation set forth above, the forward transferring movement begins to be conducted for moving the second coil wire segment 30B forward as shown by the arrow P (leftward) along the axis direction. When this takes place, a fourth turn portion A4 of the first coil wire segment 30A acts as a turn portion which the first turn portion B1 of the second coil wire segment 30B engages and, hence, is regarded to be a second turn portion in the first engaging operation commenced immediately after the completion of the second engaging operation described above.

After the relevant turn portions have been brought into engagement (woven) until final turn portions of the first coil wire segment 30A and the second coil wire segment 30B are woven, the first coil wire segment 30A and the second coil wire segment 30B are suitably rotated and translated with respect to each other. This allows the relevant turn portions of the first coil wire segment 30A and the second coil wire segment 30B to be adjusted so as to intersect with each other under an appropriate condition in an overlapping state, upon which a whole of the steps of the weaving method of the present embodiment is completed.

As set forth above, the method of manufacturing the coil assembly 20 of the present embodiment includes the locating step, the first engaging operation and the second engaging operation, enabling the weaving of the first and second coil wire segments 30A and 30B, formed with plurality of turn portions, respectively, to be simply and reliably performed. In addition, after the first and second coil wire segments 30A and 30B have been woven with each other, no need arises for deforming the first and second coil wire segments 30A and 30B. This makes it possible to achieve a reduction in the number of man-hours while avoiding the occurrence of damages to insulation films covering surfaces of the first and second coil wire segments 30A and 30B.

With the present embodiment, further, the translating movement of the second coil wire segment 30B in the first engaging step is performed to cause the second coil wire segment 30B to move from the odd-numbered turn portions A1, A3 . . . and An1 of the first coil wire segment 30A to the even-numbered turn portions A2, A4 . . . and An2 in parallel thereto. The translating movement of the second coil wire segment 30B in the second engaging step is performed to cause the second coil wire segment 30B in parallel to move from the even-numbered turn portions A2, A4 . . . and An2 of the first coil wire segment 30A to the odd-numbered turn portions A1, A3 . . . and An1 in parallel thereto. This makes it possible to allow the translating movement of the second coil wire segment 30B to be smoothly performed in a related movement with the forward transferring movement and the rotating movement. Thus, engaging movements of the first and second engaging operations can be smoothly performed.

Further, since the engaging movements of the first and second engaging operations are performed upon independently performing the rotating movement and the translating movement, the forward transferring movement of the second coil wire segment 30B enables the rotating movement and the translating movement to be reliably executed in respective movements. Therefore, associated turn portions of the first and second coil wire segments 30A and 30B can be stably brought into engagement with each other in a reliable fashion without causing any interference between the first and second coil wire segments 30A and 30B. In addition, this can simplify a structure of a weaving apparatus to be used, thereby achieving a reduction in cost.

Further, the forward transferring movement, the rotating movement and the translating movement for the engaging movement can be simultaneously performed and, in this case, the engagement movement can be performed at a high speed, thereby achieving a speed-up of the weaving operation.

Furthermore, each of the first and second coil wire segments 30A and 30B, used in the present embodiment, includes the pair of in-slot portions 30a, extending substantially parallel to each other with a given space, and the turn portion 40, formed in a stepwise configuration, with the turn portion 40 being connected to ends of the in-slot portions 30a at the connecting portions bent at a substantially right angle. This enables the in-slot portions 30 to be spaced by a further increased width. Therefore, when performing the engaging movements for the first and second engaging operations, it becomes possible to easily avoid the interference between the first and second coil wire segments 30A and 30B. In particular, this provides a further increased advantage when weaving a large number of coil wire segments.

Moreover, the first and second coil wire segments 30A and 30B are used under a condition wherein the odd-numbered turn portions A1, B1, . . . and the even numbered turn portions A2, B2, . . . are alternately located at the positions displaced from each other by 180 degrees in phase about the axis direction. This makes it possible to easily and reliably perform the first and second engaging operations. Thus, the relevant turn portions of the first and second coil wire segments 30A and 30B can be woven in a simple and reliable manner.

Besides, the first and second coil wire segments 30A and 30B are of the types in which each turn portion 42 includes a plurality of cranked portions formed in a stepwise configuration, thereby enabling a reduction in height of the turn portion 42 to be lower than that of a turn portion formed in a triangular shape with no formation of the cranked portions. This enables a reduction in protruding heights of the turn portions 42 formed on the coil wire segment and protruding outward from the stator core 12 on both axial ends thereof.

With the locating step of the present embodiment, the first turn portion A1 of the first coil wire segment 30A and the first turn portion B1 of the second coil wire segment 30B are prepositioned so as to intersect with each other in a manner as shown in FIG. 8A. In the subsequent engaging operation, the forward transferring movement is commenced as shown in FIG. 8B. In the locating step, however, a situation, where the first turn portion A1 of the first coil wire segment 30A and the first turn portion B1 of the second coil wire segment 30B are placed in the intersecting state as shown in FIG. 8B, represents that the forward transferring movement has been completed as shown in FIG. 8B. Therefore, the first engaging step, executed on a subsequent stage, is commenced from the first rotating movement for the second coil wire segment 30B as shown in FIG. 8C.

Further, the woven coil wire segments, prepared in the weaving method of the present embodiment, may be used as the first coil wire segment 30A and the first turn portion B1 that can be woven using the weaving method set forth above. This makes it possible to manufacture a coil assembly formed of a large number of woven coil wire segments. When weaving, for instance, twelve coil wire segments, the weaving method can be used to weave two sets of woven coil wire segments formed by weaving two coil wire segments, thereby preparing woven coil wire segments with four coil wire segments being woven.

Then, two sets of woven coil wire segments, composed of the four coil wire segments 30, are further woven using the weaving method set forth above, thereby preparing the woven coil wire segments with eight coil wire segments 30 being woven. Subsequently, weaving the woven coil wire segments with eight coil wire segments 30 being woven and the other woven coil wire segments with the four coil wire segments 30 being woven with each other results in a completion of weaving the twelve coil wire segments. Thereafter, ends of the respective coil wire segments are connected to one another at plural positions and a whole of the coil wire segments is formed in a torus-shape, thereby completing the coil assembly 20 with a structure shown in FIG. 3.

With the coil assembly 20 of the present embodiment, the woven coil wire segments with the plural coil wire segments 30 being woven are used as the first and second coil wire segments 30A and 30B and weaving these coil wire segments enables more than four coil wire segments 30 to be woven. This allows a large number of coil wire segments 30 to be woven, thereby easily manufacturing a coil assembly.

Second Embodiment

Next, a method of manufacturing a coil assembly 20A of a second embodiment will be described below with reference to FIGS. 10A to 10C and FIGS. 11A to 11D.

FIGS. 10A to 10C and FIGS. 11A to 11D are views illustrating how a weaving method is carried out to manufacture the coil assembly 20A of the present embodiment. In FIGS. 10A to 10C and FIGS. 11A to 11D, right-hand views show first and second coil wire segments remained under woven states as view in arrows P, respectively.

Hereunder, description is made of the weaving method for weaving coil wire segments with reference to FIGS. 10A to 10C and FIGS. 11A to 11D.

The first and second coil wire segments 30A and 30B, used in the second embodiment, have the same structures as those used in the first embodiment. In FIGS. 10A to 10C and FIGS. 11A to 11D, the respective turn portions, each formed in the stepwise shapes, of the first and second coil wire segments 30A and 30B are simply illustrated in linear shapes.

The method of weaving the first and second coil wire segments 30A and 30B includes a locating step, a first engaging step and a second engaging step which are conducted in sequence. With the present embodiment, the locating step is conducted to preposition the first and second coil wire segments 30A and 30B on the axis direction in opposition to each other such that the first turn portion A1 of the first coil wire segment 30A and the first turn portion B1 of the second coil wire segment 30B intersect with each other. The locating step of the present embodiment conducted in the same manner as that of the first embodiment and, hence, no detailed description of the same is herein omitted.

For the subsequent first engaging step, a series of engaging operations is performed to conduct a forward transferring movement, a rotating movement and a translating movement as shown in FIGS. 10B and 10C and FIG. 11A. This allows the second turn portion B2 of the second coil wire segment 30B to be brought into engagement with the first turn portion A1 of the first coil wire segment 30A. During such operations, first as shown in FIG. 10B, the forward transferring movement is performed moving the second coil wire segment 30B forward with respect to the first coil wire segment 30A as shown by the arrow P (leftward) along the axis direction. At the same time, the rotating movement is performed to rotate the second coil wire segment 30B clockwise at an angle of substantially 90 degrees as viewed in the arrow P with the first turn portion B1 (the first turn portion A1) of the second coil wire segment 30B placed at a fulcrum. This allows the second coil wire segment 30B to change in attitude at an angle of 90 degrees with respect to the first coil wire segment 30A, thereby causing an intersecting position between the first turn portion A1 of the first coil wire segment 30A and the first turn portion B1 of the second coil wire segment 30B to shift in a direction as shown by the arrow P (leftward) depending on a forward movement travel.

Subsequently, as shown in FIG. 10C, the translating movement is performed to move the second coil wire segment 30B in parallel to the first coil wire segment 30A. In this case, the second coil wire segment 30B is translated from the first turn portion B1 (on the odd-numbered turn portion) of the second coil wire segment 30B to the second turn portion B2 (on the even-numbered turn portion).

Consecutively, as shown in FIG. 11A, the rotating and moving operation is conducted rotating the second coil wire segment 30B about the axis direction with respect to the first coil wire segment 30A. In this case, the second coil wire segment 30B is rotated clockwise at an angle of substantially 90 degrees as viewed in the arrow P with the first turn portion B1 (the first turn portion A1) of the second coil wire segment 30B placed at a fulcrum. This causes the first turn portion B1 of the second coil wire segment 30B to be brought into engagement with the first turn portion A1 of the first coil wire segment 30A.

Then, in the subsequent second engaging step, the engaging operations, composed of a forward transferring movement, a rotating movement and a translating movement are performed as shown in FIGS. 11B to 11C. This causes a third turn portion B3 of the second coil wire segment 30B to be brought into engagement with the first turn portion A1 of the first coil wire segment 30A. In this case, as shown in FIG. 11B, the forward transferring movement is performed moving the second coil wire segment 30B forward with respect to the first coil wire segment 30A as shown by the arrow P (leftward) along the axis direction. At the same time, the rotating movement is performed to rotate the second coil wire segment 30B clockwise at an angle of substantially 90 degrees as viewed in the arrow P with the first turn portion B1 (the first turn portion A1) of the second coil wire segment 30B placed at a fulcrum. This allows the second coil wire segment 30B to change in attitude at an angle of 90 degrees with respect to the first coil wire segment 30A, thereby causing an intersecting position between the first turn portion A1 of the first coil wire segment 30A and the first turn portion B1 of the second coil wire segment 30B to shift in a direction as shown by the arrow P (leftward) depending on a forward movement travel.

Subsequently, as shown in FIG. 11C, the translating movement is performed to move the second coil wire segment 30B in parallel to the first coil wire segment 30A. In this case, the second coil wire segment 30B is translated from the first turn portion B1 (on the odd-numbered turn portion) of the second coil wire segment 30B to the second turn portion B2 (on the even-numbered turn portion).

Consecutively, as shown in FIG. 11D, the rotating and moving operation is conducted rotating the second coil wire segment 30B about the axis direction with respect to the first coil wire segment 30A. In this case, the second coil wire segment 30B is rotated clockwise at an angle of substantially 90 degrees as viewed in the arrow P with the second turn portion B2 (the first turn portion A1) of the second coil wire segment 30B placed at a fulcrum. This causes the third turn portion B3 of the second coil wire segment 30B to be brought into engagement with the first turn portion A1 of the first coil wire segment 30A. When this takes place, moreover, the first turn portion B1 of the second coil wire segment 30B and the first turn portion A1 of the first coil wire segment 30A are held in engagement with each other.

Even with the present embodiment, after second engaging step has been terminated, the first and second engaging operations are similarly and repeatedly conducted. Like the first embodiment, this causes the relevant turn portions of the first and second coil wire segments 30A and 30B to be brought into engagement with each other over entire lengths of the first and coil wire segments 30A and 30B.

After the relevant turn portions have been brought into engagement (woven) until final turn portions of the first coil wire segment 30A and the second coil wire segment 30B are woven, the first coil wire segment 30A and the second coil wire segment 30B are suitably rotated and translated with respect to each other. This allows the relevant turn portions of the first and second coil wire segment 30A and 30B to be adjusted so as to intersect with each other under an appropriate condition in an overlapping state, upon which a whole of the steps of the weaving method of the present embodiment is completed.

As set forth above, the method of manufacturing the coil assembly 20A of the present embodiment includes the locating step, the first engaging operation and the second engaging operation, enabling the weaving of the first and second coil wire segments 30A and 30B to be simply and reliably performed. In addition, after the first and second coil wire segments 30A and 30B have been woven with each other, no need arises for deforming the first and second coil wire segments 30A and 30B. Thus, the present embodiment has the same advantageous effects as those of the first embodiment such as a reduction in the number of man-hours and avoidance of the occurrence of damages to insulation films covering surfaces of the first and second coil wire segments 30A and 30B.

Especially, with the present embodiment, for translating the second coil wire segment 30B in the first engaging step, the second coil wire segment 30B is translated from the odd-numbered turn portions B1, B3, . . . of the second coil wire segment 30B to the even numbered turn portions B2, B4, . . . . This results in an effect of causing only the odd-numbered turn portions B1, B3 . . . to perform the forward transferring movement, the translating movement and the rotating movement of the second coil wire segment 30B, resulting in a reduction in a travel distance of the second coil wire segment 30B. This enables the engagement operations of the relevant turn portions the first and second coil wire segments 30A and 30B to speed up, thereby achieving the weaving at a high speed.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A method of manufacturing a coil assembly of a rotary electric machine by weaving coil wire segments, each including in-slot portions disposed inside slots of a stator core and turn portions disposed outside the slots and connecting the in-slot portions disposed in the slots that are different in a circumferential direction; comprising:

a placing step of placing a first coil wire segment and a second coil wire segment which are bent at a connection between the in-slot portion and the turn portion so as to be opposed to each other in order that a first turn portion of the first coil wire segment and a first turn portion of the second coil wire segment intersect each other;

a first engaging step of causing the first turn portion of one of the first and second coil wire segments to engage a second turn portion of the other one of the first and second coil wire segments by performing an engaging movement including a forward transferring movement to transfer the second coil wire segment forward to the first coil wire segment, a rotating movement to rotate the second coil wire segment about an axis direction, and a translating movement to translate the second coil wire segment; and a second engaging step of causing the first turn portion of one of the first and second coil wire segments to engage with a third turn portion of the other one of the first and second coil wire segments by performing the engaging movement.

2. The method of manufacturing the coil assembly of the rotary electric machine according to claim 1, wherein in the first and second engaging steps, the forward transferring movement, the rotating movement and the translating movement are performed independently.

3. The method of manufacturing the coil assembly of the rotary electric machine according to claim 1, wherein in the first and second engaging steps, the forward transferring movement, the rotating movement and the translating movement are performed simultaneously.

4. The method of manufacturing the coil assembly of the rotary electric machine according to claim 1, wherein the translating movement of the first engaging step is for translating the second coil wire segment from an odd-numbered turn portion to an even-numbered turn portion of the first coil wire segment, and the translating movement of the second engaging step is for translating the second coil wire segment from an even-numbered turn portion to an odd-numbered turn portion of the first coil wire segment.

5. The method of manufacturing the coil assembly of the rotary electric machine according to claim 1, wherein the translating movement of the first engaging step is for translating the second coil wire segment from an odd-numbered turn portion to an even-numbered turn portion of the second coil wire segment, and the translating movement of the second engaging step is for translating the second coil wire segment from an even-numbered turn portion to an odd-numbered turn portion of the second coil wire segment.

6. The method of manufacturing the coil assembly of the rotary electric machine according to claim 1, wherein after the second engaging step has been completed, the first and second engaging steps are similarly and repeatedly performed in order to make engagement between the first turn portion of the second coil wire segment and a fourth and subsequent turn portions of the second coil wire segment in succession.

7. The method of manufacturing the coil assembly of the rotary electric machine according to claim 1, wherein each of the coil wire segments includes odd-numbered turn portions and even-numbered turn portions alternately located at positions displaced in phase by 180 degrees about the axis direction.

8. The method of manufacturing the coil assembly of the rotary electric machine according to claim 1, wherein each of the turn portions is formed in a shape that includes a plurality of cranked portions formed in a stepped shape.

9. A method of manufacturing a coil assembly of a rotary electric machine, comprising:

a placing step of placing a first woven coil wire segment and a second woven coil wire segment manufactured by the method of manufacturing a coil assembly of a rotary electric machine according to claim 1 so as to be opposed to each other in order that the first turn portion of the first coil wire segment and the first turn portion of the second coil wire segment intersect each other;

a first engaging step of causing the first turn portion of one of the first and second woven coil wire segments to engage a second turn portion of the other one of the first and second woven coil wire segments by performing an engaging movement including a forward transferring movement to transfer the second woven coil wire segment forward to the first woven coil wire segment, a rotating movement to rotate the second woven coil wire segment about the axis direction, and a translating movement to translate the second woven coil wire segment; and a second engaging step of causing the first turn portion of one of the first and second woven coil wire segments to engage with a third turn portion of the other of the first and second woven coil wire segments by performing the engaging movement.

\* \* \* \* \*